June 12, 1951  B. N. ASHTON ET AL  2,556,746
FOLLOW-UP VALVE
Filed Oct. 16, 1947  2 Sheets-Sheet 1

INVENTORS.
BENJAMIN N. ASHTON
EUGENE V. BARKOW
BY
Campbell Brumbaugh & Free
THEIR ATTORNEYS.

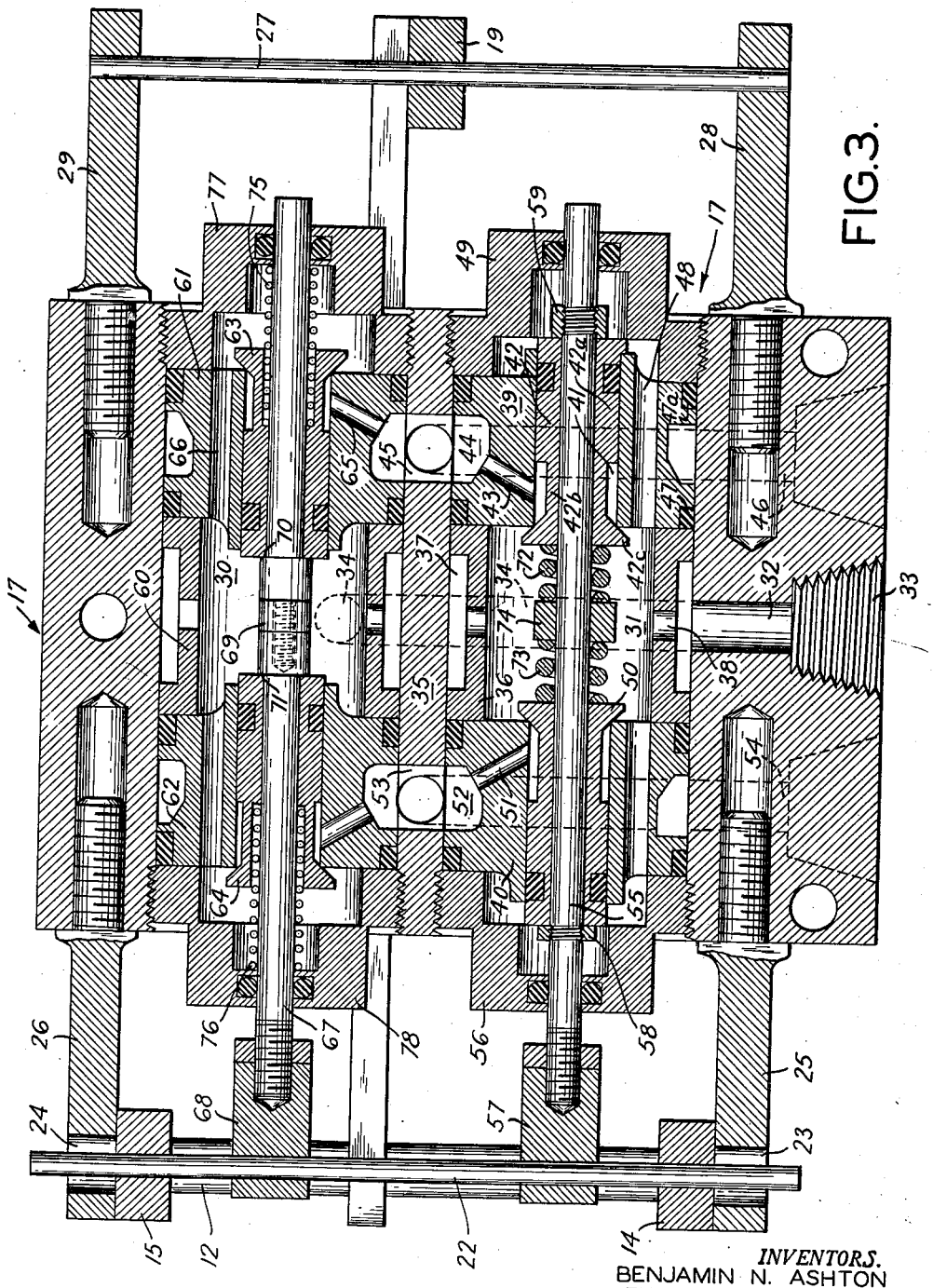

Patented June 12, 1951

2,556,746

UNITED STATES PATENT OFFICE 2,556,746

FOLLOW-UP VALVE

Benjamin N. Ashton and Eugene V. Barkow, Kingston, N. Y., assignors to Electrol Incorporated, Kingston, N. Y., a corporation of Delaware Application October 16, 1947, Serial No. 780,258

3 Claims. (Cl. 121—46.5)

This invention relates to remote control mechanisms for hydraulic systems and it relates particularly to a novel control valve construction for follow-up systems which are useful in aircraft, vehicles and the like for remote control of power elements of hydraulic systems.

A great many different types of such remote control or follow-up mechanisms have been devised heretofore in which the displacement of a manually or power operated control element regulates the flow of hydraulic liquid to operate another element at a remote point in substantial synchronism with the manually operated or power operated element. Most of these prior devices are relatively complicated and include complex gear trains, cams and the like in order to provide the follow-up action.

The present invention has as its principal object the production of a simplified hydraulic follow-up system.

Another object of the invention is to provide simplified and less expensive valves for such follow-up systems.

A further object of the present invention is to provide a follow-up system for actuating hydraulic devices including simplified connections between the control element and the hydraulically driven element.

Other objects of the invention will become apparent from the following description of a typical form of device embodying the present invention.

In accordance with the present invention, we have provided a follow-up system in which a manually or mechanically operated control member or controller may be used to actuate a selector valve of novel form to supply hydraulic fluid to a hydraulic device at a remote point. The hydraulic device is connected by means of a linkage system to the controller so that the supply of fluid to the hydraulic device is shut off when the displacement of the operating element or elements of the hydraulic device is equal or proportional to the movement of the controller.

More particularly, the system includes a poppet type of selector valve having a suitable port arrangement whereby liquid may be delivered from a source of liquid under pressure selectively to a reversible hydraulic device to drive that device in either direction of operation. The hydraulic device is in turn connected by means of a linkage system to the controller of the valve so that when the valves of the valve mechanism are opened to cause operation of the hydraulic device, the motion of the hydraulic device automatically closes the valves and stops the hydraulic mechanism when it has been displaced a distance equal or proportional to the displacement of the controller. The linkage system is further arranged so that it may act directly to transmit power to the hydraulic device, in the event of failure of the hydraulic system.

The selector valve embodying the invention includes a novel arrangement of valve plugs and actuating rods therefor whereby the assembly and adjustment of the valve are facilitated. The arrangement of the valves is such that they can be constructed to be used under conditions of high hydraulic pressure or heavy load, or they can be made of small light-weight parts for use at lower pressures and with less powerful hydraulic systems.

For a better understanding of the present invention, reference may be had to the accompanying drawing, in which:

Figure 3 is a view in cross-section taken on line 3—3 of Figure 1; and

Figure 1:
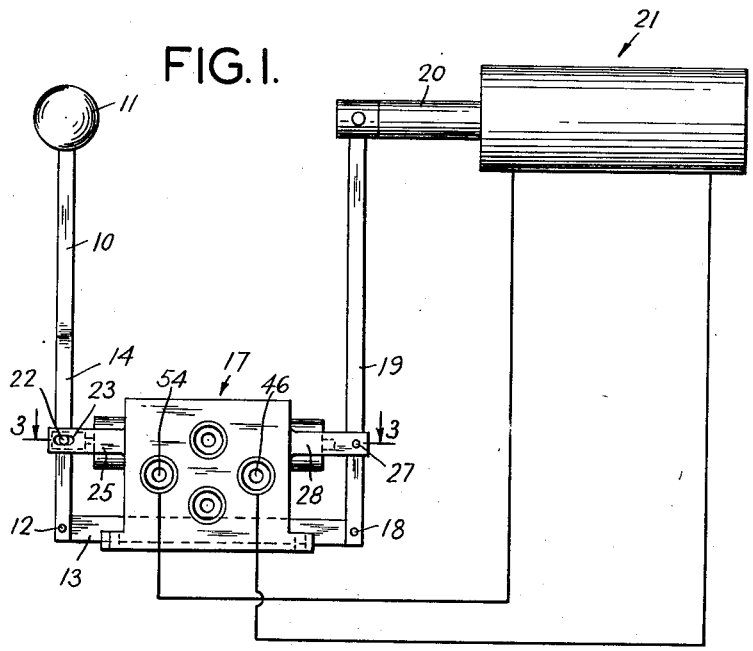
Figure 1 is a view in side elevation of a typical follow-up system in which the connections between the valve control mechanism and hydraulic jack are illustrated diagrammatically.
Figure 4:
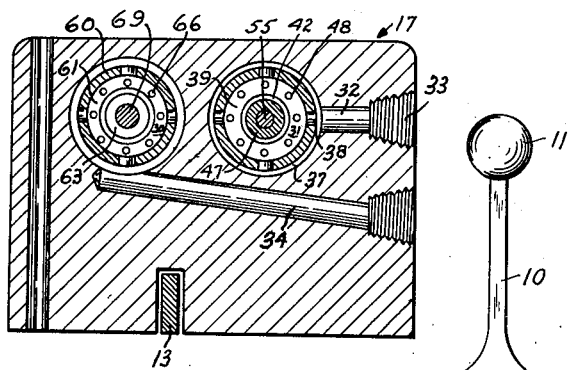
Figure 4 is a view in section taken on line 4—4 of Figure 3.

The system disclosed in Figure 1 is described hereinafter and shown in the drawings as including a hydraulic jack. It will be understood that the system may include hydraulic mechanisms other than a hydraulic jack, and, therefore, the form of the invention described herein should be considered as illustrative only.

Figure 2:
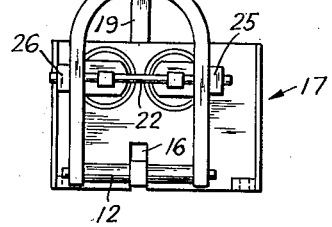
Figure 2 is a view in end elevation of the valve illustrated in Figure 1.

The system disclosed in the drawings includes a manually actuated lever or controller 10 which may be provided with a nob 11 on its upper end. It will be understood that the controller 10 may be actuated by mechanical or electrical means instead of manually, if desired. The lower end of the lever 10 is pivotally connected by means of a cross shaft 12 to a link member 13. As shown in Figure 2, the lever 10 is provided with a fork or bifurcated portion forming a pair of arms 14 and 15 which support the shaft 12.

The link 13 is connected to about the midportion of the shaft 12. The link 13 extends through a slot 16 in the casing 17 of the valve described hereinafter and has its other end connected by means of a pin 18 to a lever 19. The lever 19, as shown in Figure 1, is connected pivotally to the end of the piston rod 20 of the hydraulic jack 21 so that as the piston rod 20 moves to the right or the left, the upper end of the lever 19 is rocked correspondingly to the right or the left.

It will be understood, of course, that the upper end of the lever 19 may be connected by means of links, gears, cables, belts or other mechanical means to the piston rod 20 so as to follow the movement of the latter when the jack 21 is at a point remote from the actuating handle 10.

The controller 10 is also provided with a cross shaft or pin 22 having its ends loosely received in elongated openings 23 and 24 in a pair of standards 25 and 26 which are connected to and supported by the valve casing 17, as shown in Figure 3. The lever 10 is capable of limited sliding and pivotal movement relative to the standards 25 and 26, for a purpose described hereinafter.

The lever 19 likewise is pivotally supported on a cross pin or shaft 27 which extends between a pair of standards 28 and 29 mounted on and extending laterally from the valve casing 17.

The valve structure in the casing 17 is so arranged that when, for example, the controller 10 is moved toward the right, displacement of the cross pin 22 in the slots 23 and 24 causes liquid to be supplied to the left-hand end of the hydraulic jack 21 which will cause the piston rod 20 to move toward the right. Also, the valve vents the liquid in the right-hand end of the jack 21 to a return line so that liquid is discharged from the right-hand end of the jack 21. As the piston moves toward the right, the lever 19 is rocked clockwise around the shaft 27, thereby displacing the link 13 to the left and also displacing the lower end of the controller 10 to the left. If the controller is moved to the right one inch, the valve will remain open until the piston 20 has moved one inch to the right at which time the action of the link causes movement of the pivot 22 of the controller 10 to a position to close the valves and prevent further movement of the piston 20. Similarly, by moving the controller 10 counterclockwise or to the left, the piston 20 will be displaced to the left through an equal amount, assuming that the length of the controller 10 and the lever 19 and the lever arms thereof are equal. In this way, a relatively small movement of the controller 10 can initiate an operation of the jack 21 so as to permit an extended movement of the controller 10 in either direction.

The linkage system described above also acts as a direct power transmitting connection from the controller 10 to the piston 20 to permit movement of the piston 20 manually should the hydraulic system fail, as for example, by loss of liquid therefrom.

The valve mechanism for controlling the jack 21 will now be described. The valve casing 17 may be of generally block-like or rectangular shape, although this shape may be modified as the purpose demands. It preferably is formed of some strong and light-weighted metal such as aluminum or aluminum alloy, although it may be formed of plastic, steel or other material, if desired. As shown in Figure 3, the casing 17 is provided with two parallel bores 30 and 31 extending completely therethrough. The casing is further provided with an inlet passage 32 which extends from one end of the casing into communication with the bore 31. The inlet passage 32 may be provided with a threaded enlarged port 33 permitting it to be connected to the pressure line of a hydraulic system or to another pressure source such as a pump. Directly below the inlet passage 32, as viewed in Figure 1, is a return passage 34 of similar construction which extends transversely across the valve casing 17 and communicates with the bore 30 in the casing. The bores 30 and 31 are separated by a partition 35 which prevents the flow of liquid directly from one bore into the other. The bore 31, which communicates with the pressure passage 32 receives a collar or spacer member 36 having outwardly directed flanges at its opposite ends which fit snugly within the bore 31 and provide a space 37 between the collar and the wall of the bore 30 through which liquid can flow from the inlet passage 32. The spacer 36 is provided with a plurality of openings 38 therein so that the liquid can flow into the interior of the collar 36. At opposite ends of the spacer 36 are a pair of substantially identical valve seat elements 39 and 40. Only one of them will be described in detail herein.

The valve seat element 39 is of generally disc-like shape, fitting closely within the bore 31, and is provided with a central bore 41 for receiving a valve plug 42. Near the left-hand end of the valve seat member 39 is an inclined passage 43 which extends from the bore 41 to a recess 44 in the element 39 disposed adjacent the partition 35. The partition 35 is provided with a slot 45 which communicates with a passage 46 to one of the fluid outlet ports which can be connected, as illustrated in Figure 1, to the right-hand end of the hydraulic cylinder. The valve seat member 39 is provided with suitable grooves 47 and 47a for receiving rubber gaskets for preventing leakage between the valve seat element and the wall of the bore 31.

In order to balance the pressure at opposite ends of the valve plug 42, the valve seat may be provided with a longitudinally extending passage 48 whereby liquid may flow from within the sleeve 36 down to and into contact with the outer end of the valve plug 42. Leakage from the valve casing is prevented by means of a threaded cap member 49 which is threaded into the end of the bore and is provided with an internal shoulder engaging in the outer edge of the valve seat member 39 to retain it tightly against the sleeve or spacer 36.

The value plug 42 has a cylindrical body portion 42a, a reduced neck portion 42b and a cone poppet head 42c on the end of the reduced neck portion. When the poppet 42c is displaced to the left, as viewed in Figure 3, liquid can flow from within the sleeve 36, past the poppet head into the bore 41, and through the passage 43 into the cylinder passage 46.

The valve seat 40 is similarly constructed and cooperates in a similar way with the valve member 50 mounted therein so that when the valve 50 is unseated, liquid can flow past the valve head through the passage 51 in the seat 40 into the recess 52 and the slot 53 in the partition 35 into the connecting passage 54, which, as shown in Figure 1, may be connected by means of a suitable conduit to the left-hand end of the jack 21. The two valve elements 42 and 50 are provided with central coaxial passages which receive an actuating rod 55. The actuating rod extends through the end caps 49 and 56 and has a clevis 57 at its left-hand end. The clevis is connected to the cross shaft 22 referred to above so that the actuating shaft 55 moves in response to rocking movement of the controller. The movement of the shaft 55 is utilized to open the valves 42 and 50 selectively. To this end the shaft 55 is provided with a collar 58 which is substantially in engagement with the left-hand end of the valve plug 50 when the handle 10 is in a neutral position and the valve plug is seated. The valve actuating shaft 55 is provided with another adjustable collar 59 near its opposite end which also is in engagement with the valve plug 42 when the latter is seated and the actuating lever 10 is in a neutral position. The exact spacing of these collars can be adjusted by threading the collar 59 on a threaded portion of the shaft 55. This arrangement permits easy and accurate adjustment of the opening of the valves 42 or 50 and permits lost motion or slack to be reduced to a minimum.

The projecting ends of the shaft 55 are maintained in liquid tight relationship to the caps 49 and 56, by means of suitable sealing rings or packings.

The structure of the other two valves which are used to control the return of liquid from either end of the jack 21 to the source of pressure is similar to the valves described above except that their positions are reversed. The bore 30 receives the spacer sleeve 60 and the two spaced apart valve seats 61 and 62. These valve seats 61 and 62 are the same as the valve seats 39 and 40, but the seats thereof are disposed outwardly instead of inwardly so that the heads of the valve plugs 63 and 64 are at the outer ends of the seats. In this arrangement, liquid flows, for example, from the passage 46 inwardly through passage 65 in the seat 61, outwardly past the valve plug 63 through the longitudinally extending passage 66, into the sleeve 60 and into the return passage 34, or alternatively from the passage 54 and around the valve 64 into the return passage 34.

The valves 63 and 64 are also provided with an actuating shaft 67 that is connected by means of a clevis 68 to the cross shaft 22. The shaft 67 is made up of two parts which are threaded together and provided with a locknut 69 between the inner ends of the valves 63 and 64. The shaft 67 is provided with shoulders 70 and 71 which are substantially in engagement with the inner ends of the valve plugs 63 and 64 when the latter are seated and the controller 10 is in a neutral position. The exact spacing of the shoulders 70 and 71 can be obtained by rotating the two parts of the shaft 67 relatively.

All of the above-described valve plugs are normally urged into their seats by means of springs. The poppet heads 50 and 42 of the valves 42 and 50 are urged toward their seats by means of the springs 72 and 73 which bear against the poppets 42 and 50 and against a sleeve member 74 slidably mounted on the shaft 55 between the poppet 42 and 50.

The valves 63 and 64 are urged against their seats by means of the springs 75 and 76 bearing against the valves and the closure caps 77 and 78 at the ends of the bore 30.

Assume that the passage 32 is connected to a source of liquid under pressure, the return passage 34 is connected to a reservoir for receiving the liquid, and the passages 46 and 54 are connected respectively to the right and left-hand ends of the jack 21. When the controller 10 is pushed toward the right, the sliding pivot connection between the pin 22 and the standards 23 and 24 permits the valve actuating shafts 55 and 67 to be moved to the right. Because of this movement, the valve 50 is unseated and liquid flows through the passage 32 past the valve 50 into the passage 54 which is connected to the left-hand end of the cylinder 21. At the same time, the valve 63 is unseated by movement of the shaft 67 to the right and liquid is free to return from the right-hand end of the cylinder through the passage 46, past the valve 63, into the return passage 34. The liquid pressure forces the piston rod 20 to the right, rocks the lever 19 about the pivot 27 and displaces the link 13 to the left. Such movement will then move the lower end of the controller 10 to the left and will tend to move the pin 22 to the left if the controller 10 is held stationary, which action results in a movement of the valve actuating shafts 55 and 67 to the left and causes the poppets 50 and 63 to engage their seats. A continued movement of the controller 10 to the right is permitted, however, because the movement of the link 13 changes the position of one pivot for the controller 10, and, therefore, an extended movement of both the controller 10 and the piston rod 20 can be obtained. However, when the controller 10 is stopped, the movement of the piston rod will then cause the valves 50 and 63 to be seated.

Similarly, movement of the controller 10 to the left will open the valves 42 and 64 and cause movement of the piston 20 to the left in an amount equal or proportional to the movement of the controller 10 depending upon the relation of the lengths of the lever arms of the controller 10 and the lever 19.

It will be observed that all the valves are normally seated when the controller 10 is in a position of repose. However, when the controller 10 is moved in one direction or the other, one pair of the valves connected to the opposite ends of the cylinder is opened. This causes movement of the piston rod 20 in one direction or the other corresponding to the movement of the controller 10. Inasmuch as the piston rod 20 is connected by the lever 19 and the link 13 to the controller 10, movement of the piston tends to displace the pivot 12, and if the controller 10 is moved as described above and then stopped, continued movement of the piston 20 will cause displacement of the lower end of the controller 10 thereby allowing the valves to close and stop the movement of the piston. If, however, a continued pressure in one direction is applied to the controller 10, the piston 20 and the controller will continue to move until the piston reaches the end of its travel. For this reason, the controller 10 can move through an extended arc during the movement of the piston. Also, a small initial movement of the controller 10 which is limited by the length of the slot 23 will set into operation a series of movable elements which permits an extended movement of the controller 10 because of the shifting of the pivot point 12.

From the preceding description, it will be apparent that the valve actuating mechanism and the follow-up linkage system disclosed herein provides a very accurate control of the movement of a hydraulically actuated device such as a hydraulic jack. Because of the simplicity of the construction, it is easy to manufacture and adjust and can be used for many purposes, such as, for example, in the control of aircraft landing flaps and the like without unduly increasing the weight of the aircraft. The device is capable of use with heavy duty constructions by suitably changing the size and or proportions of the parts thereof. Therefore, the form of the invention described herein should be considered as illus-

We claim:

1. A selector valve comprising a valve casing having a pair of substantially parallel bores therein, separate ports communicating with said bores, a pair of annular elements in each of said bores having valve seats thereon, the seats on said elements in one bore being spaced apart and facing inwardly, the seats on the elements in the other bores being spaced apart and facing outwardly, separate poppet valve members slidably mounted in each annular element, means resiliently urging said valve members toward their respective seats, each poppet valve member having an axial opening therethrough, an actuating shaft extending axially through each bore and through the axial openings in the poppet valves, spaced apart shoulders on said shafts for engaging said poppet valve members to unseat one poppet valve member in each bore upon movement of the shaft therein in one direction and unseat the other poppet valve member in the bore in the other direction of movement therein, another pair of ports in said casing, one communicating with the interiors of one annular member in each bore and the other communicating with the interiors of the other annular members in said bores for flow of liquid therethrough when said poppet valve members are unseated, a lever connected to said shafts for simultaneously moving them in the same direction, and a member pivotally supporting one end of said lever, said member being movable relative to said casing.

2. A selector valve comprising a valve casing having a pair of substantially parallel bores therein, separate ports communicating with said bores, a pair of annular elements in each of said bores having valve seats thereon, the seats on said elements in one bore being spaced apart and facing inwardly, the seats on the elements in the other bores being spaced apart and facing outwardly, separate poppet valve members slidably mounted in each annular element, means resiliently urging said valve members against said seats, each poppet valve member having an axial opening therethrough, an actuating shaft extending axially through each bore and through the axial openings in the poppet valves, spaced apart shoulders on said shafts for engaging said poppet valve members to unseat one poppet valve member in each bore upon movement of the shaft therein in one direction and unseat the other poppet valve member in the bore in the other direction of movement therein, means for adjusting the spacing between said shoulders, another pair of ports in said casing, one communicating with the interiors of one annular member in each bore and the other communicating with the interiors of the other annular members in said bores for flow of liquid therethrough when said poppet valve members are unseated, a lever connected to said shafts for moving them simultaneously in the same direction, and a member movable relative to said casing pivotally supporting one end of said lever.

3. A selector valve comprising a valve casing, two pairs of poppet type valves therein, a pair of shafts slidable axially in said casing, each shaft being connected to a different pair of said two pairs of valves for displacing one valve of each pair upon movement of said shafts in one direction and the other valve of each pair upon movement in the opposite direction, means biasing said valves to closed position, an inlet port in said casing for supplying fluid to one side of one pair of said valves, a return port in said casing communicating with one side of the other pair of valves, a first connection port in said casing communicating with one valve of each pair at the side opposite to said inlet and return ports, a second connection port in said casing communicating with the other valve of each pair at the side opposite to said inlet and return ports, whereby upon movement of said shafts in one direction said inlet port is connected to one connection port and the other connection port is connected to said return port, a lever connected to said shafts for moving them simultaneously in the same direction, and a member movable relative to said casing and pivotally supporting one end of said lever.

BENJAMIN N. ASHTON.
EUGENE V. BARKOW.

REFERENCES CITED

The following references are of record in the file of this patent:

UNITED STATES PATENTS

| Number | Name | Date |
|---|---|---|
| 439,763 | Purvis | Nov. 4, 1890 |
| 620,204 | Wilkins | Feb. 28, 1899 |
| 650,777 | Bromley | May 29, 1900 |
| 840,866 | Wilkins | Jan. 8, 1907 |
| 884,200 | Obernesser | Apr. 7, 1908 |
| 1,217,117 | Curtis | Feb. 20, 1917 |
| 2,043,732 | Bragg | June 9, 1936 |
| 2,283,810 | Johnson | May 19, 1942 |
| 2,377,115 | Werff | May 29, 1945 |